United States Patent [19]
Currie

[11] Patent Number: 4,969,129
[45] Date of Patent: Nov. 6, 1990

[54] CODING SEISMIC SOURCES

[75] Inventor: William S. Currie, Washington, Tex.

[73] Assignee: Texaco Inc., White Plains, N.Y.

[21] Appl. No.: 409,907

[22] Filed: Sep. 20, 1989

[51] Int. Cl.$^5$ .............................................. G01V 1/28
[52] U.S. Cl. ...................................... 367/41; 181/113
[58] Field of Search ...................... 367/23, 38, 41, 63; 181/113; 371/71; 364/421

[56] References Cited

U.S. PATENT DOCUMENTS

| | | | |
|---|---|---|---|
| 3,234,504 | 2/1966 | Wischmeyer | 367/41 |
| 3,264,606 | 8/1966 | Crook et al. | 367/41 |
| 4,204,278 | 5/1980 | Nelson | 367/41 |
| 4,223,399 | 9/1980 | Hackett | 367/41 |
| 4,685,132 | 8/1987 | Bishop et al. | 364/717 |
| 4,729,066 | 5/1988 | Nelson et al. | 367/41 |
| 4,748,576 | 5/1988 | Beker et al. | 364/717 |
| 4,758,997 | 7/1988 | Nelson | 367/49 |
| 4,768,174 | 8/1988 | Castle | 367/39 |
| 4,780,856 | 10/1988 | Becquey | 367/23 |
| 4,815,139 | 3/1989 | Eriksson et al. | 381/94 |

OTHER PUBLICATIONS

Wayne Stahnke, "Primitive Binary Polynomials", Mathematics of Computation, vol. 27, No. 124, Oct., 1973, pp. 977-980.

*Primary Examiner*—Ian J. Lobo
*Attorney, Agent, or Firm*—Jack H. Park; Robert A. Kulason; Ronald G. Gillespie

[57] ABSTRACT

One or more seismic sources impart seismic pulses into the earth in a coded sequence. The coded sequence is composed of a minimum of three cycles of a Galois sequence of order N, where N is a positive integer. The response of subsurface formations to the coded sequence is obtained and correlated with one cycle or the outgoing Galois sequence of the same order. Correlation properties of the Galois sequences provide a way to sum a large number of seismograms that are superimposed in time, improving the signal to noise ratio while keeping the field time in which the seismograms are obtained to a minimum. Using this encoding technique, responses of subsurface formations to concurrent activation of each of several sources can be obtained and separated from each other.

32 Claims, 10 Drawing Sheets

CODING SEISMIC SOURCES

BACKGROUND OF INVENTION

1. Field of Invention

The present invention relates to obtaining and processing seismic data.

2. Description of Prior Art

Noise reduction is of particular importance in the practice of seismic exploration. One of the most widely used noise reduction techniques involves averaging several seismograms that have been obtained by essentially repeating the seismic exploration sequence. A seismic source is initiated, a seismogram is recorded and the procedure is repeated a number of times. The recorded seismograms are presented to a summing device either on location or at a computer facility remote from the location of the seismic survey. By summing, the noise is averaged down in magnitude relative to the coherent signals that are sought as indicators of subsurface conditions. The signal-to-noise ratio is thereby improved.

The number of seismograms to average is limited by the cost of repeating the experiment, the repeatability of the source and the destructive characteristics of the source. For example, when dynamite is used as the source it is rare when more than one seismogram is obtained at each shot point. Averaging to overcome noise is replaced by costly procedures such as deepening shot holes and/or using larger charge sizes. When either the weight drop, hydraulically driven land impulse source, or explosive gas driven plate land impulse source is used as the source, perhaps as many as 100 individual seismograms may be obtained and summed at one shot point location. In these operations, time is the expense. Each seismogram requires about thirty seconds for the weight drop method and about ten seconds for the other two, so the time required for each shot point can be quite large, i.e. 15 to 50 minutes. The result obtained is a seismogram of less than six seconds duration which hopefully has an acceptable signal-to-noise ratio.

The swept frequency technique, which has to a large extent replaced weight dropping and the explosive gas driven plate land impulse source, combines the time-consuming averaging process with a computer-intensive correlation process that requires costly computing equipment to produce results that are sensitive to the choice of parameters for the frequency sweep function. In current swept frequency operations, about fifteen 20-second seismograms are taken and summed for each vibration point, requiring five to ten minutes at each vibration point. The 20-second summed seismogram is later correlated with the sweep function using expensive computing equipment at a seismic processing center to produce a representation of a recovered seismogram that is less than ten seconds duration. Furthermore, the representation of the recovered seismogram can be changed considerably by changing the sweep function that drives the vibrator source equipment and/or the sweep function used in the correlation process.

SUMMARY OF INVENTION

Briefly, the present invention provides a new and improved method of seismic exploration with a coded sequence of impulses. A seismic source is activated to emit impulses of at least three cycles of a Galois sequence of order N, N being a positive integer greater than one. The response of subsurface formations to the emitted cycles of impulses is sensed at a seismic detector. The sensed response of the subsurface formations is then correlated with the cycles of the Galois sequence. A record of the correlation results is then formed for further processing, geophysical analysis or both.

Typically a number of seismic detectors are used to sense the response of the subsurface formations. The seismic detectors may be in a seismic line of profile, a three-dimensional array or a vertical seismic profiling array.

Several seismic sources may also be used. The sources can be caused to each emit cycles of Galois sequences simultaneously. Correlation obtains an increased signal-to-noise ratio in a markedly shorter time.

Alternatively, the sources can be caused to each emit cycles of Galois sequences at different time sub-intervals in a composite time interval. The individual responses of subsurface formations sensed at each seismic detector may be recovered from the total response to activation of each source simultaneously.

DESCRIPTION OF PREFERRED EMBODIMENT

1. Theoretical Considerations

With the present invention, it has been found that certain code sequences known from algebraic coding theory possess correlation properties that can be exploited in the generation and detection of seismic energy. The code sequences are based on a theory of finite groups and fields, known as the Galois theory, and are known as Galois sequences. The sequences derive from the irreducible polynomials over the field of integers modulo 2. Such polynomials are known for quite large orders. Stahnke in "Primitive Binary Polynomials," Mathematics of Computation, Vol. 27, No. 124, October 1973, lists for each order up to 168 the irreducible (primitive) polynomial with the minimum number of terms. From Stahnke, the irreducible polynomials through order 11 are:

| Order | Polynomial |
|---|---|
| Order 1 | $x + 1$ |
| Order 2 | $x^2 + x + 1$ |
| Order 3 | $x^3 + x + 1$ |
| Order 4 | $x^4 + x + 1$ |
| Order 5 | $x^5 + x^2 + 1$ |
| Order 6 | $x^6 + x + 1$ |
| Order 7 | $x^7 + x + 1$ |
| Order 8 | $x^8 + x^6 + x^5 + x + 1$ |
| Order 9 | $x^9 + x^4 + 1$ |
| Order 10 | $x^{10} + x^3 + 1$ |
| Order 11 | $x^{11} + x^2 + 1$ |

Figure 1:
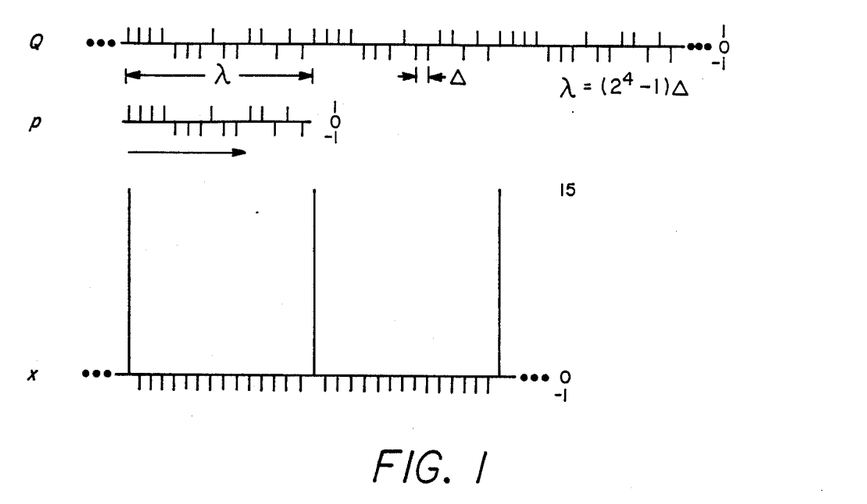
FIG. 1 is a timing diagram of a Galois sequence of order 4 composed of digital pulses of +1 and −1 and correlation results obtained therefrom.

Galois sequences are periodic, and the number of 1's and −1's in each period is determined by a power of 2 which is called the order of the sequence. FIG. 1 displays such a sequence for order 4 and illustrates the correlation property that can be exploited.

Referring to FIG. 1, three periods of a Galois sequence of order 4 are graphically shown as Q, and one period of the sequence is shown as p. In each period there are $2^4-1$ elements having value 1 or −1. Any 15 consecutive elements can be chosen as p. Consequently, the choice of the period p as shown is arbitrary. When the elements are equally spaced as illustrated in FIG. 1, one sequence period length is $(2^4-1)\Delta$, where $\Delta$ is the time separation between successive sequence elements.

The correlation function x of the finite sequence p and Q is also displayed in FIG. 1. The correlation function X, computed by $$X_k = \sum_{i=1}^{15} p_i Q_{i+k}, \quad k = -\infty,\ldots,-1,0,1,\ldots,\infty, \quad (1)$$

is also periodic. It has value $2^4-1$ at the beginning of each period defined by p and value −1 elsewhere.

In general for an order n, each period of the Galois sequence Q will have $2^n-1$ elements, each element having value 1 or −1. The correlation function x, p correlated over Q, will accordingly have value $2^n-1$ at the beginning of each period, defined by a choice of p, and −1's elsewhere.

Figure 2:
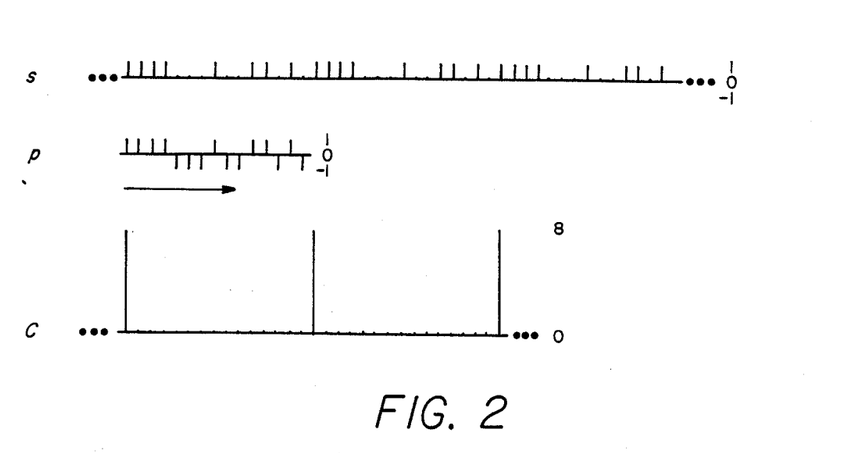
FIG. 2 is a timing diagram of a Galois sequence of order 4 composed of digital pulses of 1 and 0 and correlation results obtained therefrom.

FIG. 2 illustrates the correlation property in a more usable form for application to the seismic method. Referring to FIG. 2, the sequence labeled s consists of the elements of Q, as indicated in FIG. 1, with the −1's of Q replaced by 0's. The correlation function, labeled C in FIG. 2, computed by:

$$C_k = \sum_{i=1}^{15} p_i S_{i+k}, \quad k = -\infty,\ldots,-1,0,1,\ldots,\infty, \quad (2)$$

is again periodic. It has value $2^3$ at the beginning of each period defined by p and value 0 elsewhere.

In general for an order n, each period of the Galois sequence S will have $2^n-1$ elements, each having value 0 or 1. The finite sequence p, defined by a chosen period, will have $2^n-1$ elements, each having value 1 or 0. The correlation function C, or p correlated over s, will be periodic, with all elements having value 0 except the first element of each period defined by p, which will have value $2^{n-1}$.

Consider now convolution of a Galois sequence S of order n with a wavelet w which has a finite time duration less than one period of S. Since the correlation function of p over S is a periodic sequence of impulses or "spikes" separated by the period length λ of S, p can be considered as the deconvolution operator for S over the set of wavelets having finite time duration less than one period of S. In other words, if w is a wavelet of finite time duration less than one period length λ and w is convolved with S to produce Y, then the correlation of p over Y will produce a periodic function W consisting of $2^{n-1}w$ repeated for each cycle of S.

Symbolically:

$$Y(t) = w(t)*S \quad (3)$$

$$W(t) = p \; Y(t) = \sum_{i=-\infty}^{\infty} 2^{n-1}w(t - i\lambda), \quad (4)$$

where λ is the period length, n is the order of the sequence, * denotes convolution and denotes correlation.

Thus w can be recovered from Y by choosing any cycle of Y and dividing by the scale factor $2^{n-1}$. Since Y is the convolution of w with S, the recovery of w from Y as described is deconvolution, and p is the appropriate deconvolution operator.

Figure 3:
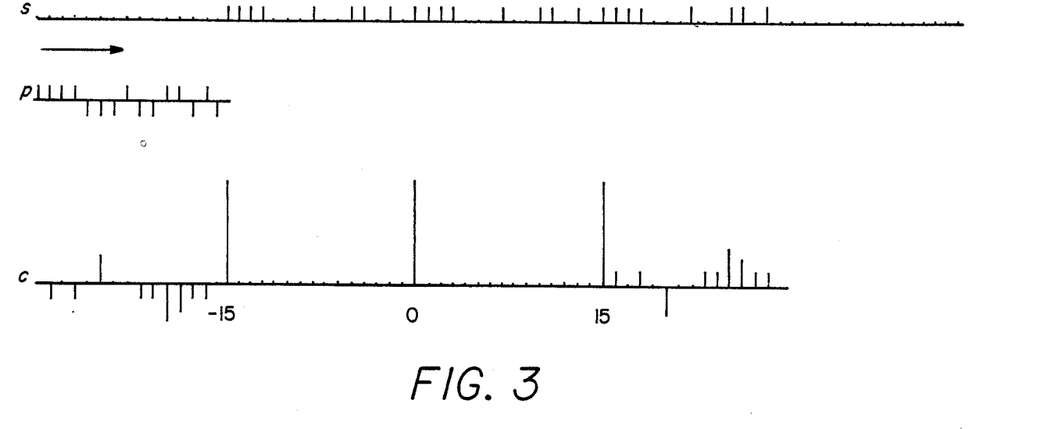
FIG. 3 is a timing diagram of a finite Galois sequence of order 4 composed of digital pulses of 1 and 0 and correlation results obtained therefrom.

Since practical application of the correlation properties just discussed to seismic and other data enhancement technologies requires that the sequences be of finite time duration, consider a finite sequence s consisting of the elements from three cycles of S as given in FIG. 2. FIG. 3 displays s, p and c; where c is the finite correlation function of p correlated across s, and p is one cycle of Q as given in FIG. 1. It is apparent from looking at FIG. 3 that the finiteness of s introduces end effects in the correlation function c. However two cycles of C are maintained in the central portion of c.

Figure 4:
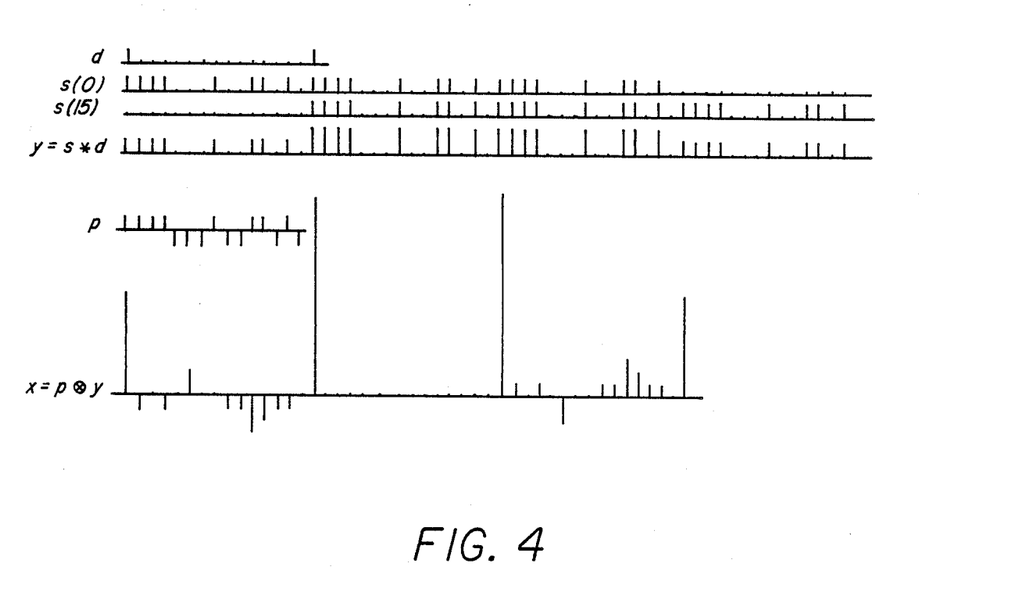
FIG. 4 is a timing diagram of three cycles of a Galois sequence of order 4 of digital pulses 1 and 0 and correlation results obtained therefrom.

Consider next a superposition of s as shown in FIG. 4. The sequence labeled d in FIG. 4 is a simple finite superposition operator consisting of two unit impulses or "spikes" separated by one period length, λ, of Q.

$$\lambda = (2^n - 1)\Delta. \quad (5)$$

For the case of FIG. 4, n=4, λ=15. The convolution of d with s is shown as y =s*d, which is the sum of the components labeled s(0) and s(15). The sequence labeled x =p y is the finite correlation function of p correlated within y computed by:

$$x_j = \sum_{i=0}^{14} p_i y_{i+j}, j = 0, 45. \qquad (6)$$

In other words, x is simply the correlation of p over y without tapers. However, the end effects noted in FIG. 3 and caused by the finiteness of s are still apparent in the first and third cycles of x in FIG. 4. But the second cycle of x is not contaminated by either the pre-end or post-end effect that results from the correlation of p over s. Thus, any wavelet w of finite time duration less than one period length of Q can be reproduced in the second cycle of x by correlating w*s with p. The second cycle of X contains $2^{n-1}$w. Thus, three cycles of S are required for p to be the deconvolution operator for s over the set of wavelets of finite time duration less than one period length of Q.

Figure 5:
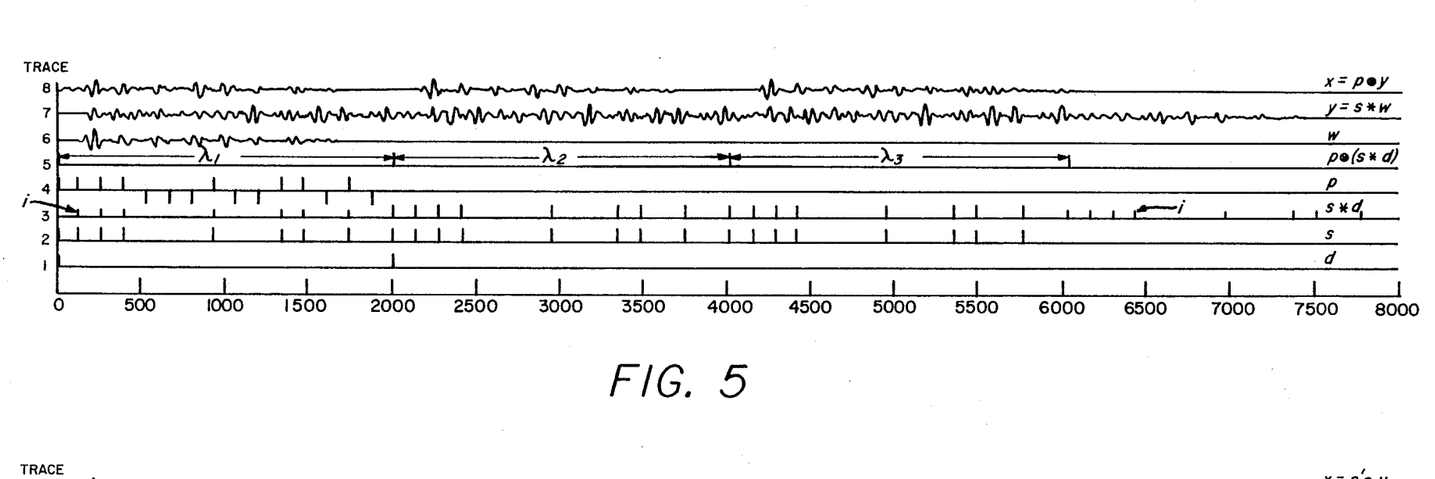
FIG. 5 is a timing diagram illustrating correlation properties.

FIG. 5 summarizes the correlation properties just discussed. Referring to FIG. 5:

a. Trace 1 displays the delay operator d which is convolved with the sequence s of order 4 shown on Trace 2 to produce s*d as shown on Trace 3.

b. Trace 4 displays the sequence p which is correlated within Trace 3 to produce p (s*d) as shown on Trace 5.

c. Trace 6 displays a wavelet, w, of finite time duration less than one period length.

d. Trace 7 displays y=s*w, the convolution of the sequence s with the wavelet w.

e. Trace 8 displays x=p y, the correlation of p within y.

Each trace has been normalized independently, so that the scale factors mentioned earlier do not cause the plotting of FIG. 5 to be disproportionate. FIG. 5 indicates quite clearly that p can be considered as the deconvolution operator for s, since the second cycle of x contains w. It should be noted that the first and third cycles of x contain w contaminated by the end effects that result from s being of finite time duration. The cause can be seen as small amplitude spikes i in the first and third cycles of Trace 3, which are the end effects that must be avoided for p to be the deconvolution operator for s. It is clear from FIG. 5 that three cycles of a sequence Q of order n are necessary to avoid the end effects. Should more than three cycles of Q be used to construct s, x would contain a repeated cycle of w for each additional cycle in s. Thus it becomes clear that as more cycles of Q are used to construct s, the formulation for x given by Equation (1) holds, and periodicity is achieved in the limit as the number of cycles is increased. Thus as the number of cycles is increased x→X.

2. Exploiting for Seismic Purposes the Correlation Properties of Galois Sequences Since the response of the earth to a seismic source lasts for a finite amount of time, a seismic trace is a finite time duration wavelet when the time over which the trace is recorded is greater than the length of time that the response lasts. Thus w, as shown on Trace 6 of FIG. 5, could represent at some detector location the response of the earth to a seismic source initiated at time=0. Assuming such a response and also assuming that transmission of the energy in the earth is linear, y=s*w, as shown on Trace 7 of FIG. 5, could represent a seismic trace detected at the same location in response to the seismic source being initiated sequentially at the times indicated by the spikes on s, as shown on Trace 2 of FIG. 5. The earth itself would in this context be the convolution mechanism as indicated by y=s*w.

If y, as shown on Trace 7 of FIG. 5, were received by a detector and presented to a correlation device designed to correlate p, as shown on Trace 4 of FIG. 5, with y, w could be recovered from y by selecting only the second period length from x, as shown on Trace 8 of FIG. 5. As a matter of efficiency, x in its entirety does not have to be computed. A correlation device can thus be designed to produce only the period length containing w when y is presented as input to the correlation device. Thus it is not necessary to record y and at some later time compute the correlation of p with y to obtain w, although such an implementation might be desired for other purposes.

For such purposes, the correlation could be performed by a general purpose computer, y being recorded on magnetic tape, for example, and later presented to the computer. The first and third period lengths of x, as shown on Trace 8 of FIG. 5, are either not computed or are discarded, leaving w in the second period length free of the end effects that distort the representations of w occurring in the first and third period lengths of x.

Figure 6:
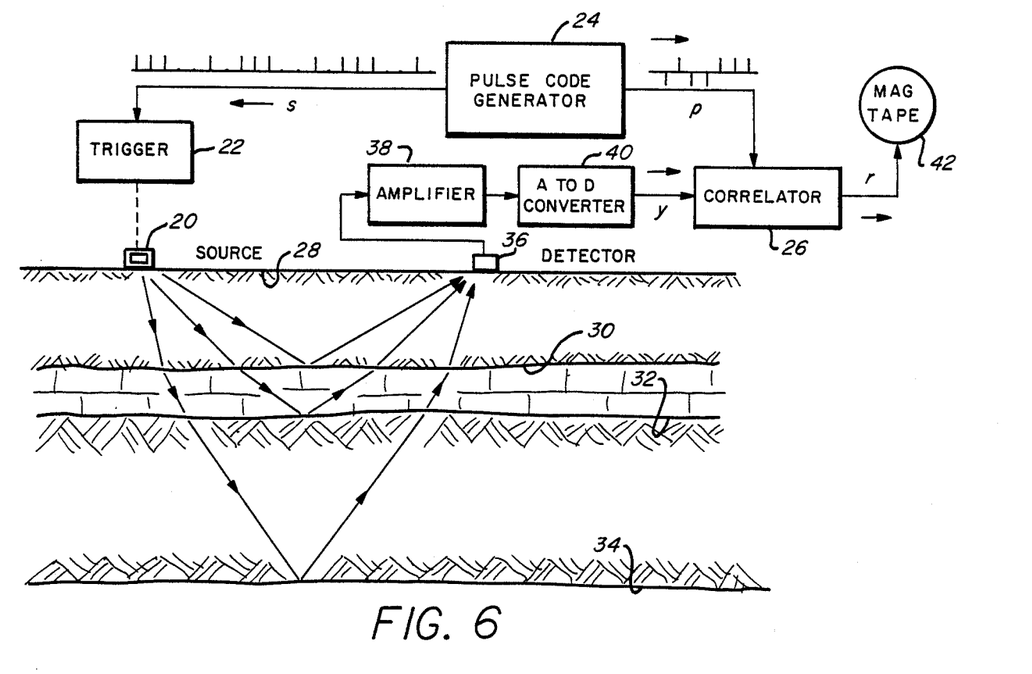
FIGS. 6, 6A and 10 are schematic diagrams of seismic surveys being performed according to the present invention.

FIG. 6 displays schematically the operational concept for implementing the above-disclosed method into seismic exploration. A seismic source 20 is activated by a trigger mechanism 22 to impart seismic impulses of desired amplitude in a coded sequence S of at least three cycles of a Galois sequence P of order N, N being any positive integer greater than one. The coded Galois sequence is formed in pulse code generator 24 and provided to trigger mechanism 22 and also to a correlator 26.

The coded sequence of seismic impulses from source 20 enter the earth at surface 28 travelling downwardly. Portions of the acoustic energy of the seismic impulses are deflected upwardly by subsurface formations, such as those indicated schematically at 30, 32, and 34. Such upwardly reflected acoustic energy is sensed by a seismic detector or geophone 36 which forms an electrical indication of what is sensed. After passing through a conventional amplifier 38 and an analog to digital (A-to-D) converter 40, the signal sensed by geophone 36 is furnished as input y to the correlator 26.

Correlator 26 may be a special purpose computer or a programmed general purpose digital computer to perform the correlation function P y resulting in an output wavelet r which is furnished to a recording mechanism 42. The output wavelet r may also be furnished to a conventional data display either concurrently with or after recording in the recording mechanism 42.

Figure 12:
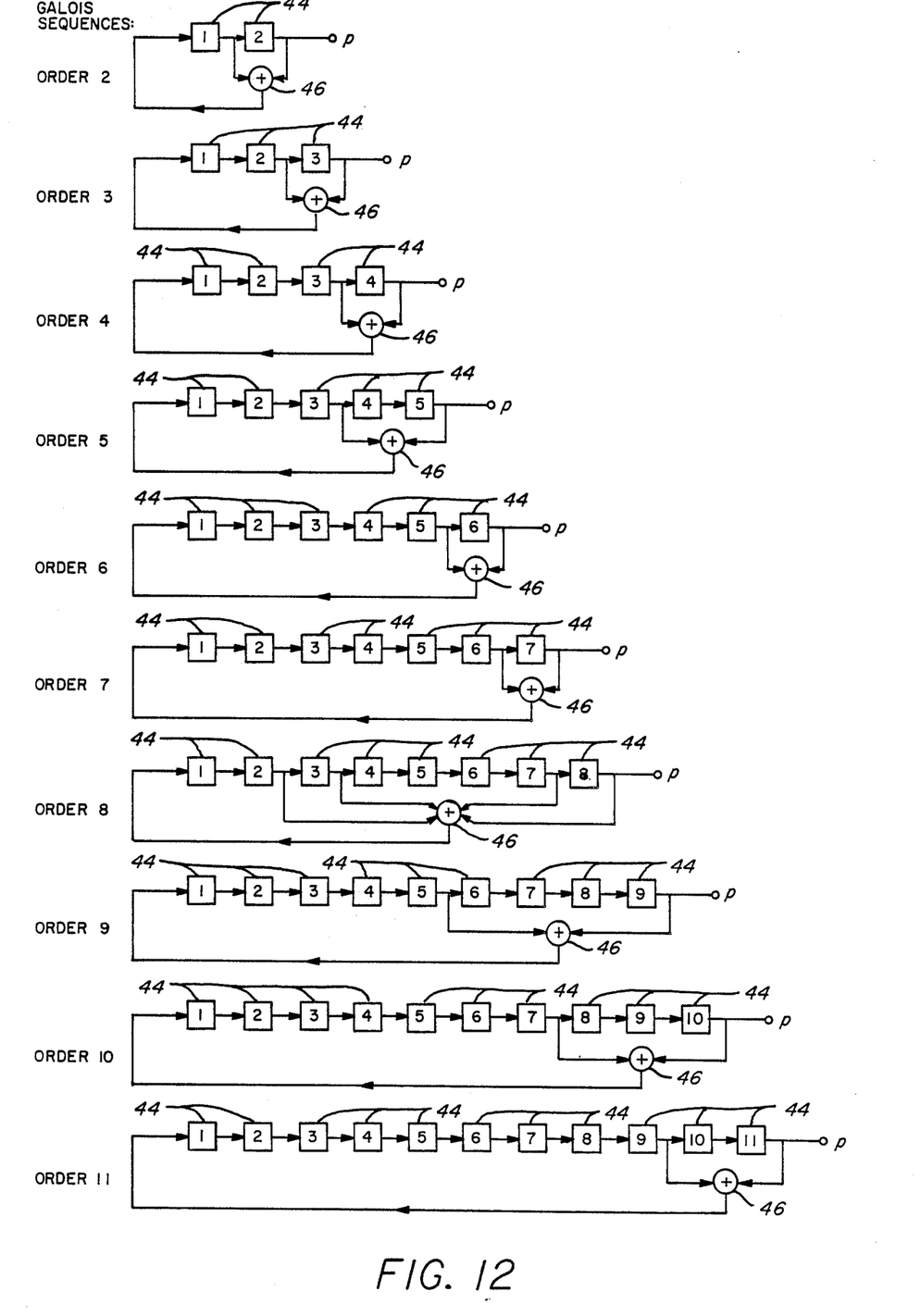
FIG. 12 are schematic diagrams of pulse code generators for Galois sequences of order 2 through 11 which can be used in the seismic survey equipment shown in FIGS. 6, 6A, and 10.

FIG. 12 illustrates schematically digital circuit diagrams of digital shift registers 44 electrically connected as indicated to modulo-2 adders or Exclusive OR gates 46 to function as pulse code generator 24 to generate Galois sequences of orders 2 through 11, respectively. The digital data bit in the shift registers in FIG. 12 is transferred to the next successive shift register 44 or Exclusive −OR gate 46, as illustrated, on receipt of a clock pulse from a conventional digital data clock. As has been set forth, the time interval between clock pulses is the interval Δ. The digital data bit from the last successive shift register 44 for each of the pulse code generators for Galois sequences of the various orders depicted in FIG. 12 is furnished as the output P of pulse code generator 24. The pulse code generator selected depends on the desired order of the Galois sequence. It should be understood that codes of higher orders of Galois sequences can as well be generated corresponding to the irreducible polynomials for such higher orders, given for example in the Stahnke reference cited above.

The following chart sets forth the Galois sequence of order 4 formed in the pulse code generator 24 as output signal p in FIG. 6.

| TIME | SHIFT REGISTER 44 STATE | | | | OUTPUT |
|---|---|---|---|---|---|
| | 1 | 2 | 3 | 4 | p |
| 0 | 1 | 1 | 1 | 1 | 1 |
| 1 | 0 | 1 | 1 | 1 | 1 |
| 2 | 0 | 0 | 1 | 1 | 1 |
| 3 | 0 | 0 | 0 | 1 | 1 |
| 4 | 1 | 0 | 0 | 0 | 0 |
| 5 | 0 | 1 | 0 | 0 | 0 |
| 6 | 0 | 0 | 1 | 0 | 0 |
| 7 | 1 | 0 | 0 | 1 | 1 |
| 8 | 1 | 1 | 0 | 0 | 0 |
| 9 | 0 | 1 | 1 | 0 | 0 |
| 10 | 1 | 0 | 1 | 1 | 1 |
| 11 | 0 | 1 | 0 | 1 | 1 |
| 12 | 1 | 0 | 1 | 0 | 0 |
| 13 | 1 | 1 | 0 | 1 | 1 |
| 14 | 1 | 1 | 1 | 0 | 0 |
| 15 | 1 | 1 | 1 | 1 | 1 |

3. Reciprocal Implementation

A second implementation of the method of the present invention can be achieved by further exploiting correlation properties. Results equivalent to those displayed in FIG. 5 can be obtained by interchanging the roles of the p and s sequences as follows:

Let s' be the sequence p with −1's replaced by 0's,

Let p' be the sequence s with 0's replaced by −1's, and

Compute the correlation function of p' over y by:

$$x_i = \sum_{j=1}^{2k} p'_{k-i+j} y_j, \; i = 1, k; k = 2^n - 1. \tag{6}$$

Figure 5A:
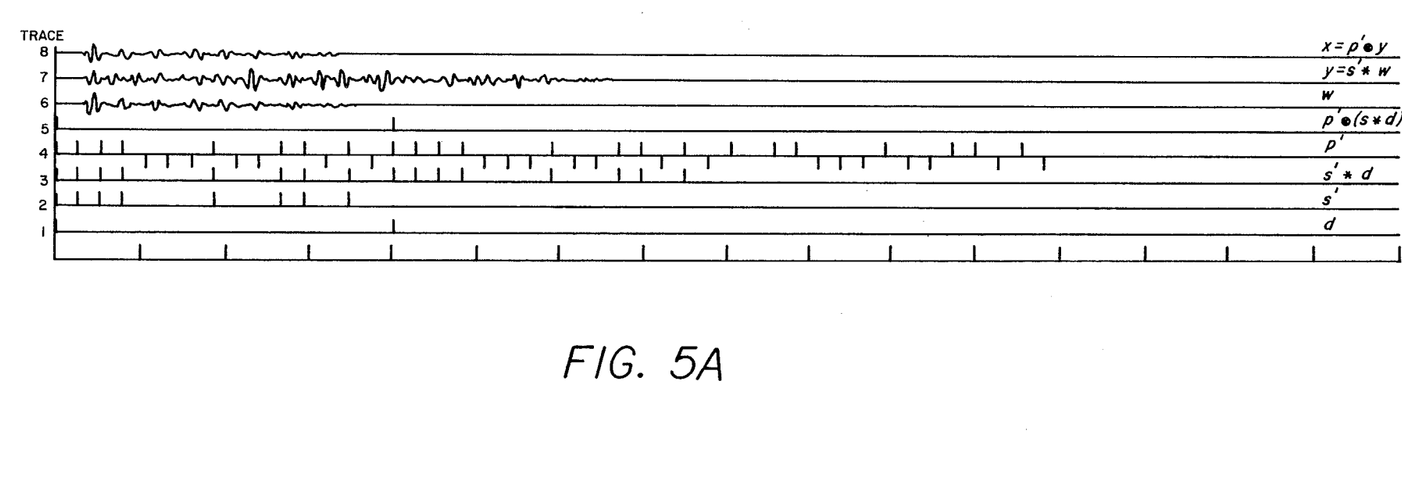
FIG. 5A is an alternative timing diagram illustrating equivalent correlation properties to those of FIG. 5.

FIG. 5A displays such a procedure. Comparison of FIG. 5A with FIG. 5 shows that the same results are achieved in either case. It is to be noted that the correlation process produces only one period length containing w free of the end effect distortions noted earlier.

Figure 6A:
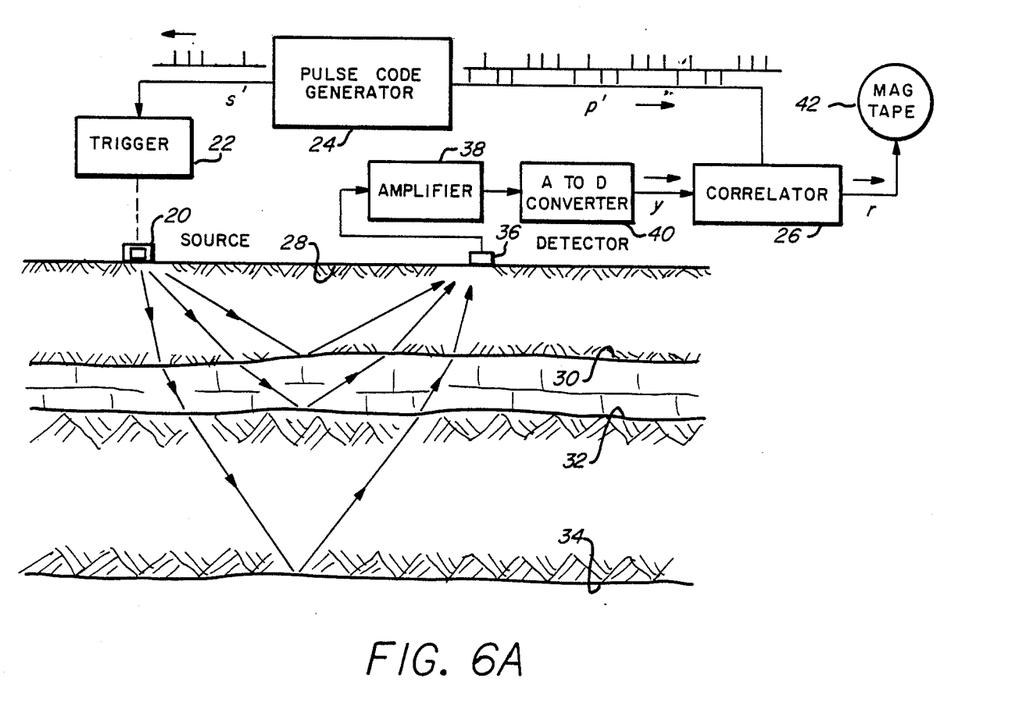

Corresponding to FIG. 6, FIG. 6A displays the equivalent implementation of the foregoing method of FIG. 5A into seismic operations. Like structure in FIG. 6A to that of FIG. 6 bears like reference numerals. As can be seen, only the signals s' and p' formed in pulse code generator 24 of FIG. 6A differ from FIG. 6.

Implementation of the method indicated in FIG. 6A requires that the source be initiated over only one cycle of the chosen Galois sequence rather than over three cycles as indicated in FIG. 6. So for a given Galois sequence, the duty cycle of the source is three times less when the method is implemented according to FIG. 6A as opposed to being implemented as indicated by FIG. 6. The correlator in FIG. 6A, however, must do more additions than the correlator in FIG. 6.

The choice to implement the method as indicated in FIG. 6 or FIG. 6A depends on: (1) the cost of sources as opposed to correlation costs, and (2) the existing noise level. Benefits to be gained from such implementations are set forth below in the following material.

Note on FIGS. 6 and 6A that the output from the correlator is labeled r rather than w to emphasize that the recovered wavelet r represents the response of the earth to a single activation of the source. r is the recovered seismogram.

4. Signal to Noise Improvement

The method of the present invention of coding the source 20 to sequentially repeat at times specified by three cycles (FIG. 6) of a Galois sequence of order N,N being a positive integer greater than one, and correlating the response of the earth with one cycle of the sequence suggests a much less expensive way to accomplish noise reduction through averaging than the currently used methods provide. The same holds true for the reciprocal technique of FIG. 6A. Since each time the source 20 is initiated a seismogram is also initiated, the present method causes the process to be repeated for each impulse or spike in the source sequence. The resulting individual seismograms are thus convolved (time shifted and summed) in the earth rather than being individually recorded and summed by seismic detector devices at the surface.

The correlation procedure described above thus provides a deconvolution mechanism that recovers the single seismic response from the total response. Noise is suppressed by the summing that is inherent to the convolution and correlation processes.

Since there are only 1's and −1's in the signal p, the correlator 26 does not have to do any multiplications, making it possible to do the correlation, as indicated in FIGS. 6 and 6A, in real time as the data, y, are being received. This feature of the disclosed method presents a decided advantage over the swept frequency technique, since the multiplications required to perform correlation of the received swept frequency data with the vibrator sweep function force the correlation to be performed by an expensive computer facility, which in turn forces the received data to be recorded on magnetic tape and shipped to the computer facility. The swept frequency correlation results representing the response of the earth are usually not available in the field. Consequently, field personnel do not have available the evidence needed to assure that they have optimally conducted the data-gathering phase of the seismic survey. Such is not be the case for the method of the present invention, thus the advantage.

Figure 7:
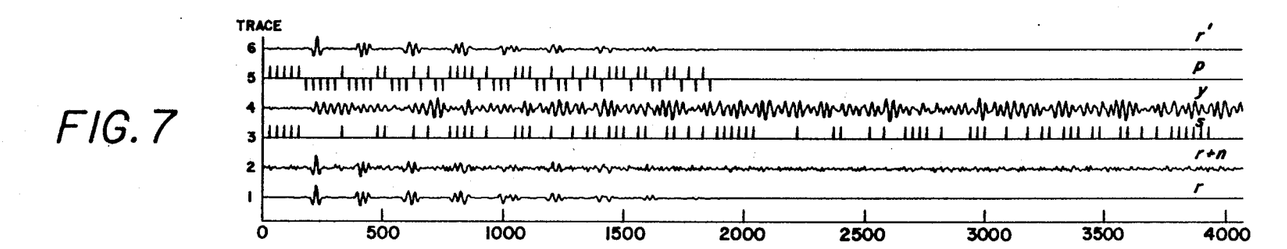
FIGS. 7 and 7A, taken jointly, is a waveform diagram as a function of time illustrating noise suppression obtained in seismic data with the present invention.
Figure 7A:
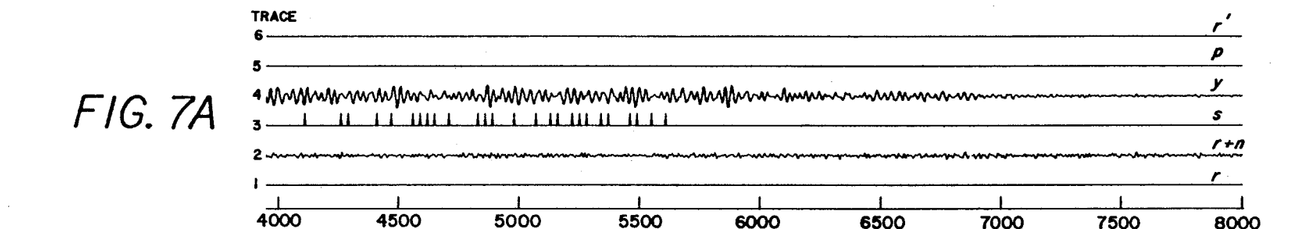

FIGS. 7 and 7A, taken jointly, display how signal-to-noise ratio is improved through application of the method of the present invention. Referring to FIGS. 7 and 7A:

a. Trace 1 contains r, the noise-free response of the earth to a single activation of the source. Each of the 9 wavelets that appear on Trace 1 represents a seismic reflection from the subsurface.

b. Trace 2 contains r plus noise, n. The signal-to-noise ratio varies from 5 to .5, depending on which of the 9 reflections is referenced.

c. Trace 3 contains 3 cycles of a Galois sequence s of order 6 as defined above.

d. Trace 4 contains the convolution y of Trace 1 with Trace 3 plus the noise used in Trace 2. Trace 4 represents the response of the earth in the presence of noise to the activation of the source at times indicated on Trace 3 and is also the signal presented to the correlation device as indicated by y in FIG. 6.

e. Trace 5 contains the sequence p of order 6 as defined above used by the correlation device as indicated in FIG. 6 to compute the second cycle of the correlation function of Trace 5 with Trace 4.

f. Trace 6 contains r', the second cycle of the correlation function, which represents the recovery of r from the noisy environment.

Comparing Trace 6 with Trace 1, it is apparent that the first eight reflections have been recovered almost as they appear on Trace 1. The ninth reflection, however, remains indistinguishable from the noise. The overall signal-to-noise ratio has nonetheless been considerably improved by application of the method of the present invention as indicated by comparing Trace 6 with Trace 2 in FIGS. 7 and 7A.

Figure 8:
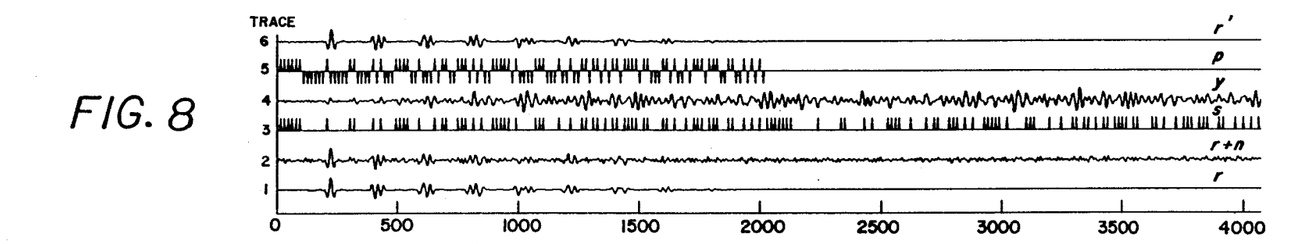
FIGS. 8 and 8A, taken jointly, is a waveform diagram as a function of time illustrating noise suppression obtained in seismic data with the present invention.
Figure 8A:
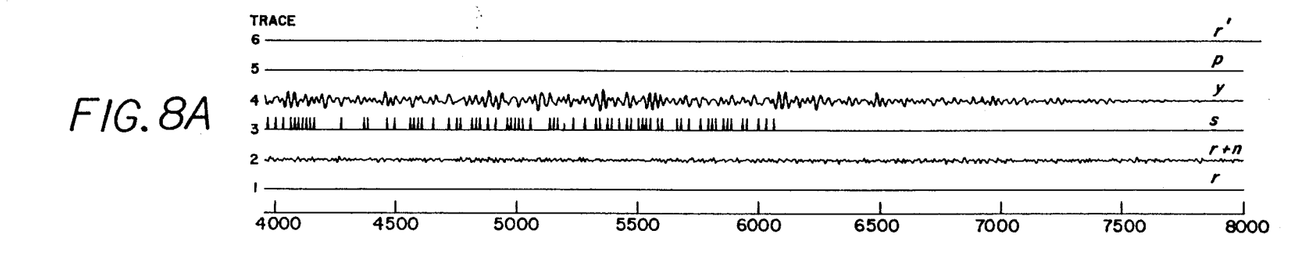

FIGS. 8 and 8A, taken jointly, are the same as FIGS. 7 and 7A, except the order of the Galois sequence has been increased from six to seven. Comparing Trace 6 with Traces 1 and 2 in FIGS. 8 and 8A, it is apparent that all nine reflections have been recovered by the method of the present invention, clearly indicating that the method has potential to improve the signal-to-noise ratio as a function of the order of the sequences that are employed. The improvement can be verified by comparing Trace 6 in FIG. 8 with Trace 6 in FIGS. 7 and 7A.

Figure 8B:
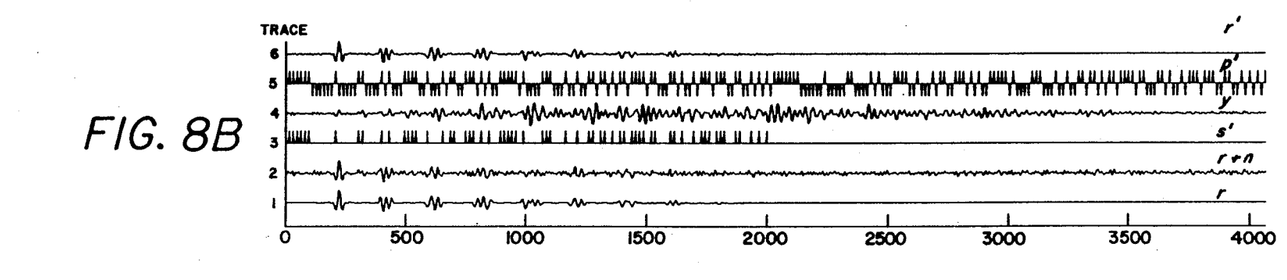
FIGS. 8B and 8C, taken jointly, is a waveform diagram as a function of time illustrating noise suppression obtained in seismic data with the present invention.
Figure 8C:
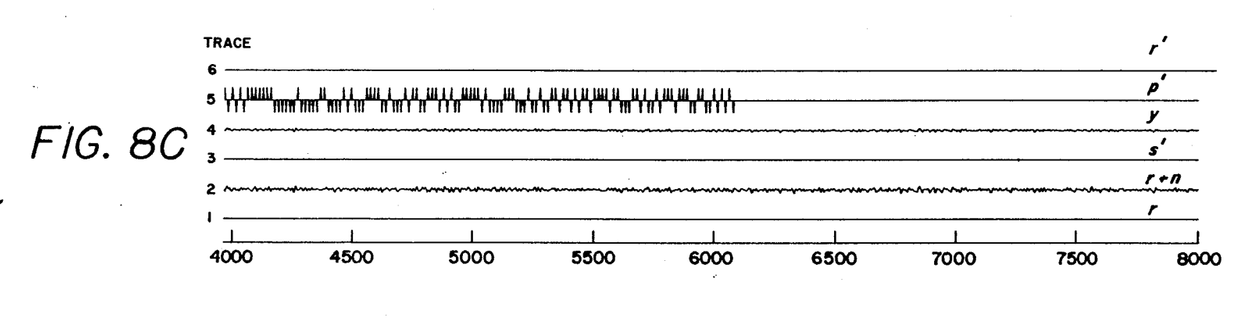

FIGS. 8B and 8C, taken jointly, contain results obtained from the reciprocal implementation as shown in FIG. 6A (provided with the same parameters as FIGS. 8 and 8A except that s' and p' are the sequences used rather than s and p) indicate that the noise suppression achieved is not as good as that achieved in FIGS. 8 and 8A. Since three times as many seismograms are summed for FIGS. 8 and 8A as for its reciprocal implementation, the increased redundancy provides an improvement in the signal-to-noise ratio by a factor $\sqrt{3}$. Had there been no noise, the resulting r in both cases would have been identical, as was pointed out earlier in comparing FIGS. 5 and 5A. For a given order, this suggests that the implementation as in FIG. 6A would be chosen for operation in a low noise environment.

Figure 9A:
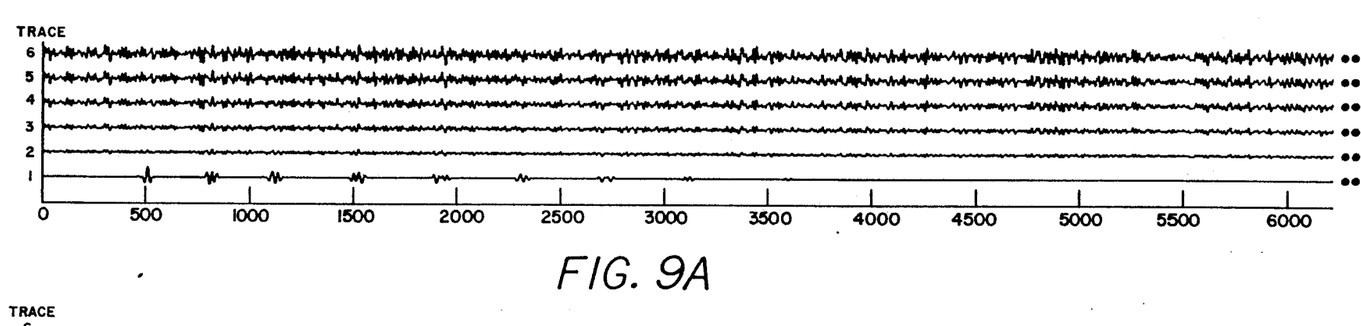
FIGS. 9A and 9B, taken jointly, is a waveform diagram as a function of time of repetitive sequences of coded seismic pulses according to the present invention.
Figure 9B:
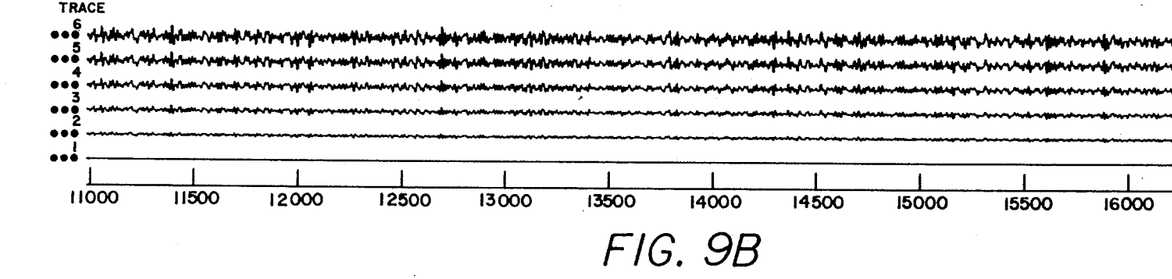
Figure 9C:
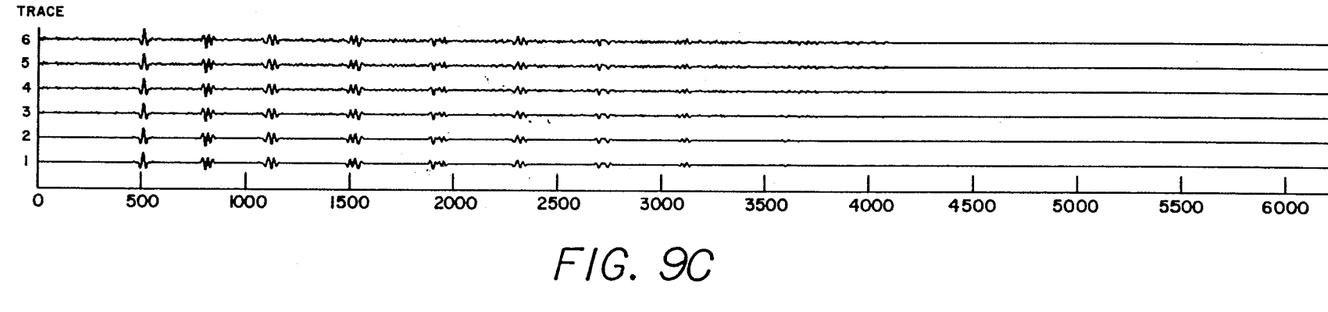
FIG. 9C is a plot of waveform diagrams as a function of time of results obtained from processing the waveforms of FIGS. 9A and 9B according to the present invention.

FIGS. 9A and 9B, compared with FIG. 9C, further illustrate the signal-to-noise improvement that the method of the present invention provides. FIGS. 9A and 9B, taken jointly, display six traces containing the same reflection signals with varying amounts of noise added. The reflection signals are displayed on Trace 1 with no noise. On Traces 2 through 6, noise has been added to the signals on Trace 1 such that:

The signal-to-noise ratio on Trace 2 varies from 1.0 to .1;

The signal-to-noise ratio on Trace 3 varies from 0.5 to 0.05;

The signal-to-noise ratio on Trace 4 varies from 0.33 to 0.033;

The signal-to-noise ratio on Trace 5 varies from 0.25 to 0.025;

The signal-to-noise ratio on Trace 6 varies from 0.2 to 0.02;

depending on which reflection signal is being referenced.

FIG. 9C displays six traces corresponding to the six traces on FIG. 9A and 9B. Each trace on FIG. 9C results from applying the method of the present invention as explained above in FIGS. 7A and 7B and 8A and 8B using, however, Galois sequences of order 10. FIGS. 9A and 9B when compared with FIG. 9C show dramatically the ability of the method of the present invention to recover signals from a noise environment. To accomplish the same degree of noise suppression as shown in these Figures, a conventional seismic survey wherein individual seismograms are recorded and summed would require the acquisition of 512 seismograms. In general the noise reduction obtained from the disclosed method, implemented according to FIG. 6, is equivalent to the noise reduction obtained from recording and summing $2^{n-1}$ repeats of a single seismic shot.

Since random noise is suppressed by a factor $\sqrt{N}$ (whenever N repeats of a seismic shot conducted in the presence of random noise are averaged), the signal-to-noise ratios in FIG. 9C are an improvement by a factor of 22.6 over the signal-to-noise ratios in FIGS. 9A and 9B.

Of particular importance, the noise suppression exhibited between FIGS. 9C contrasted with FIGS. 9A and 9B is accomplished in less than 16.5 seconds when the method of the present invention is implemented as illustrated in FIG. 6 with the parameters used to produce FIGS. 9A and 9B. Recording and summing 512 individual seismograms to accomplish the same degree of noise suppression would require at least four hours.

5. Practical Considerations

Since the source 20 must have the capability of being cocked and activated at fixed time intervals, the parameter crucial to seismic application of the disclosed method is $\Delta$, the minimum time separation between consecutive impulses or spikes on the source sequence s. In forming FIG. 9A and 9B as illustrated, $\Delta$ has a value of .004 seconds, which is too small to be practical in controlling the sequential activation of any known or contemplated source. However, a value more like .1 second for $\Delta$ is practical. With $\Delta=.1$ second, the results achieved by the example shown in FIGS. 9A, 9B and 9C could be accomplished in 310 seconds as opposed to the four hours indicated above to produce equivalent noise suppression with conventional means.

6. Marine Seismic Surveys

It should be understood that the noise suppression capability of the method of the present invention is especially beneficial for marine seismic operations, where cable tow noise is always present and must be suppressed to reveal small amplitude reflection signals. For the method of the present invention in marine operations, several small seismic sources are towed behind a marine survey vessel in such a manner that they can be activated as prescribed in the coded Galois sequence of the chosen order as they pass over each shot point. The received seismic traces from each of the detector groups on the streamer cable are then correlated as described above to produce the enhanced response.

7. Recovery of Signals From Multiple Sources

Figure 10:
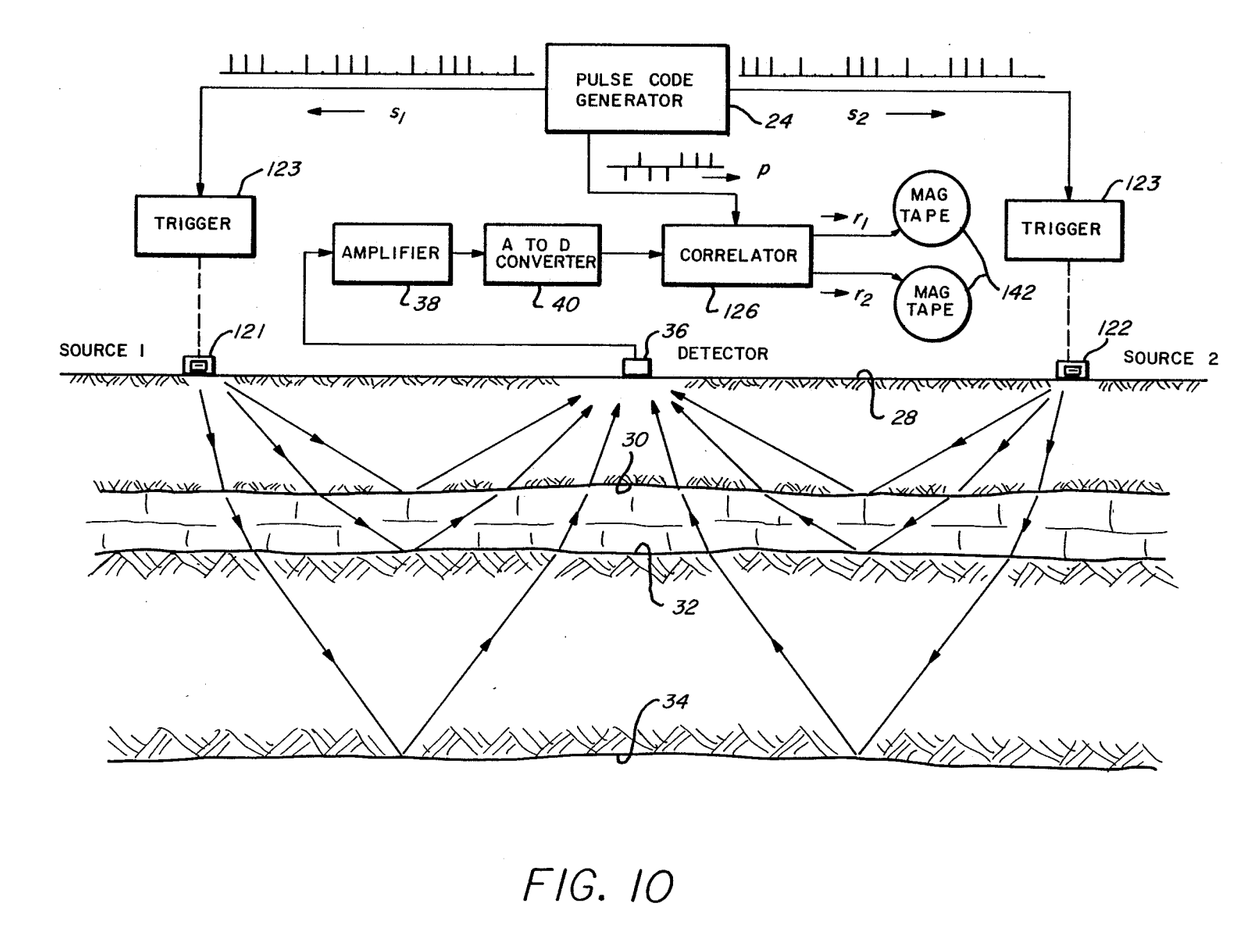
Figure 11A:
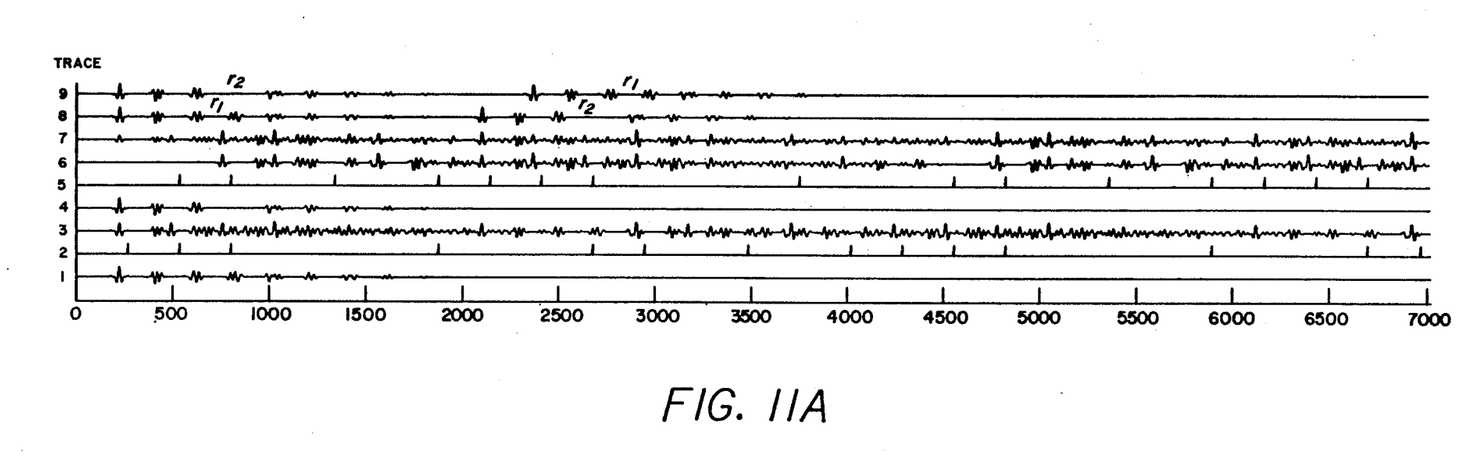
FIGS. 11A and 11B, taken jointly, is a waveform diagram which illustrates the recovery of individual responses of subsurface formations from a summed response of two seismic sources operating simultaneously according to the present invention.
Figure 11B:
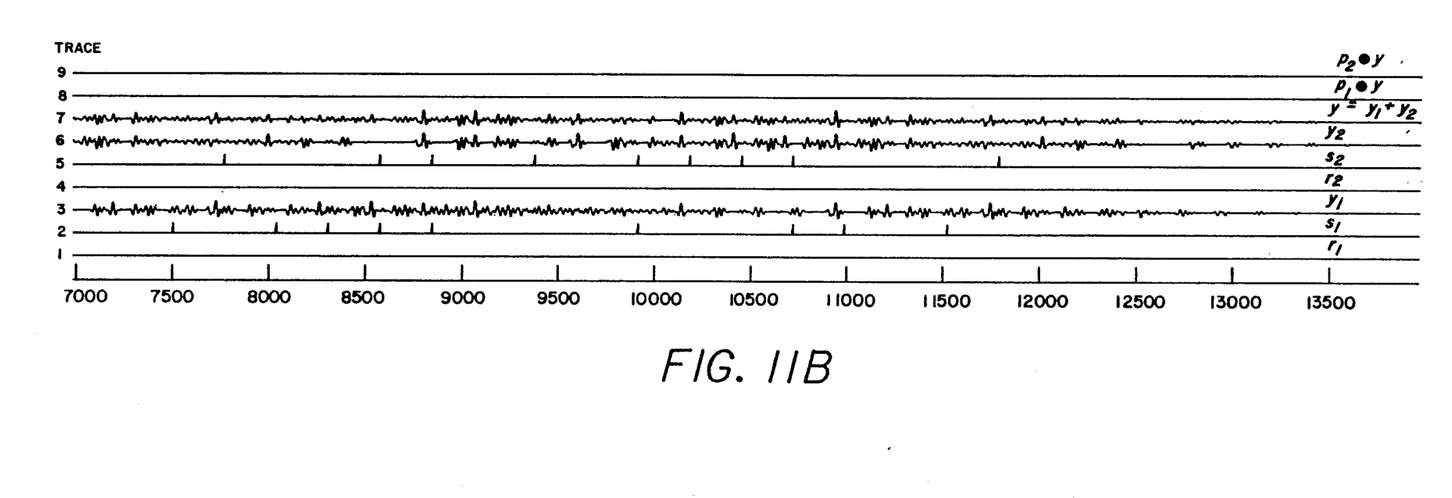

The correlation properties of Galois sequences also provide a means to identify and recover the responses of the earth to each source from the total response produced by a multiplicity of sources activated simultaneously, the total response being detected by one detector. FIGS. 10, 11A and 11B display how this ability can be exploited in the practice of a seismic survey. FIG. 10 shows schematically a field arrangement for two seismic sources 121 and 122 operating simultaneously.

In FIG. 10, like structure to that of FIG. 6 bears like reference numerals, since it functions in a like manner. The seismic sources 121 and 122 are each activated by an associated trigger mechanism 123 by pulse sequences $s_1$ and $s_2$, respectively, formed in pulse code generator 24. Pulse code generator 24 also provides the Galois sequence p to a two-channel correlator 126.

Seismic energy from sources 121 and 122 enters the earth surface 28. After reflection of portions of such energy by subsurface formations 30, 32 and 34, detector 36 forms an electrical signal representative of such reflections. The electrical signal after passage through amplifier 38 and analog-to-digital convert 40 is provided as input signal y to the correlator 126. Correlator 126 forms output signals $r_1$ and $r_2$ which are in turn furnished to recorders 142 which form records of these output signals.

FIGS. 11A and 11B contain an example of how the method of the present invention according to FIG. 10 is beneficial in seismic exploration.

Referring to FIGS. 11A and 11B:

a. Trace 1 represents the response $r_1$ of the earth to a single activation of source 121, as indicated on FIG. 10.

b. Trace 2 displays the source function $s_1$.

c. Trace 3 represents the response $y_1$ of the earth to source 121 being activated at the times indicated by the spikes on $s_1$, Trace 2.

d. Trace 4 represents the response of the earth $r_2$ to a single activation of source 122, as indicated in FIG. 10.

e. Trace 5 displays the source function $s_2$.

f. Trace 6 represents the response $y_2$ of the earth to source 122 being activated at the times indicated by the spikes on $s_2$, Trace 5.

g. Trace 7 is the sum $y_1+y_2$ of Traces 3 and 6 and represents the response of the earth to the simultaneous operation of the sources 121 and 122, source 121 being activated at the times indicated by $s_1$ and source 122 being activated at the times indicated by $s_2$.

h. Trace 8 displays the correlation function of $p_1$, the first cycle of $s_1$, with Trace 7, the combined response received by the common detector 36, as indicated on FIG. 10. Only the cycle of the correlation function that is free of end effects is displayed.

i. Trace 9 displays the correlation function of $p_2$, the first cycle of $s_2$, with Trace 7, the combined response received by the common detector 36, as indicated on FIG. 10. Only the cycle of the correlation function that is free of end effects is displayed.

The results exhibited in FIGS. 11A and 11B are of considerable significance. Trace 8 contains $r_1$ followed in time by $r_2$, and Trace 9 contains $r_2$ followed in time by $r_1$. Thus the method of the present invention can be applied to encode seismic source signals in such a way that the individual responses of the earth to a single activation of each source can be recovered from the total response to all sources being activated simultaneously, each source controlled by a code defined by a particular time subinterval of a Galois sequence of order N in a composite time interval. FIG. 10 illustrates how this is accomplished for two sources. In this case the order of the Galois sequence is four and the two codes, $s_1$ and $s_2$, are separated by one-half the period length $\lambda$. $\Delta$, the minimum time interval between successive impulses or spikes in the sequence, has been chosen such that one-half the period length $\lambda$ is longer in time than the response of the earth to a single activation of either source 121 or 122.

Either Trace 8 or Trace 9 of FIGS. 11A and 11B can be used to recover $r_1$ and $r_2$. $s_1$ and $s_2$ are chosen so that the time intervals in which $r_1$ and $r_2$ exist do not overlap The choice of $p_1$ over $p_2$ for the correlation operator 126 forces Trace 8 rather than Trace 9 to be produced by the correlation process. Thus $r_1$ and $r_2$ can easily be extracted as a final stage of the correlation process and recorded separately as illustrated in FIG. 10. To do so is, however, not essential. Either Trace 8 or Trace 9 could be recorded in the field and sorted later into $r_1$ and $r_2$ at a computing facility. If, however, both Trace 8 and Trace 9 are computed, two representations of $r_1$ and two representations of $r_2$ can be obtained and used to advantage.

Let $r_{11}$ be the recovered representation of $r_1$ obtained out of the correlation of $p_1$ with y.

Let $r_{12}$ be the recovered representation of $r_1$ obtained out of the correlation of $p_2$ with y. Let $r_{21}$ be the recovered representation of $r_2$ obtained out of the correlation of $p_1$ with y.

Let $r_{22}$ be the recovered representation of $r_2$ obtained out of the correlation of $p_2$ with y.

One can then form the matrix $$\begin{matrix} r_{11} & r_{12} \\ r_{21} & r_{22} \end{matrix}$$

the rows of which contain representations of a common response.

The rows of such a matrix can be averaged to obtain even more redundancy. The rows can also be used to verify that the seismic system is producing consistent results. The elements of any row must be the same, within acceptable statistical limits that can be set depending on the noise level present. If the row elements are not essentially the same, the assumption of linearity then can be deemed questionable.

Presentation of the results in such a matrix form can also be an aid to a geophysical interpreter.

In general, for M sources:

1. Select a Galois sequence of order N, $N>M$ and large enough to provide adequate noise reduction.

2. Fix $\Delta$ such that the period length, $\lambda$, is greater than M times the maximum time response of the earth to a single activation of the M sources.

3. Divide $\lambda$ into M equal intervals.

4. Code the sequential activation of source i with three cycles (or reciprocally one cycle) of the Galois sequence of order N that begins at the onset of interval i.

5. Simultaneously activate M sources, each source code controlled as indicated by step number 4.

6. Present y, the total response of the earth to the activation of the M sources as received by a single detector 36, to a correlation device designed to correlate y with one cycle (or reciprocally three cycles) of the Galois sequence of order N, producing r, the period length of the correlation function that is free of end effects.

7. Corresponding to the M intervals used to define the source codes, identify the M non-overlapping time subintervals in r such that any interval i of r contains $r_i$, the representation of the response of the earth to a single activation of source i.

8. Separate out of r each $r_i$.

If y is correlated with each $p_i$ corresponding to each of the M intervals, the matrix representation of the results in general is $(r_{ij})$, where $r_{ij}$ is the response $r_j$ recovered out of the correlation of $p_i$ over y. Presentation of the $r_{ij}$ in matrix form can be a useful diagnostic tool for the geophysical interpreters.

Benefits to seismic exploration afforded by the method of the present invention dramatically expand when one considers that a multiplicity of detectors is usually deployed in close proximity to each source location and that either the source is moved, or the detectors are moved, or both source and detectors are moved as the survey progresses. The movement of sources and/or detectors is a major expense in time and labor. The ability afforded by the method of the present invention permits extraction of the response to each source from the response of the earth to several coded sources operating simultaneously. This provides the possibility of greatly reducing the costs of seismic surveys. For a fixed layout of detectors, coded sources positioned at desired locations can be excited simultaneously. Doing so reduces the time of the survey, since the sources do not have to be moved from one location to the next and do not have to be excited independently from each other at large time intervals. Also, noise suppression that is difficult to achieve from a single source activated independently at the several locations is provided by the coding and decoding that the present invention employs.

8. OTHER USES

The attributes disclosed for the method of the present invention are especially desirable for three-dimensional (3-D) seismic surveys or for vertical seismic profiling. Acoustic logging and logging while drilling might well find also application for the method.

The foregoing disclosure and description of the invention are illustrative and explanatory thereof, and various changes in the size, shape and materials, as well as in the details of the illustrated construction may be made without departing from the spirit of the invention.

I claim:

1. A method of seismic exploration with a coded sequence of impulses of finite time duration for correlation with a deconvolution operator to form a reflection wavelet which avoids end effects resulting from correlation, comprising the steps of:
   (a) activating a seismic source to emit impulses of at least three cycles of a Galois sequence of finite time duration and of order N, N being a positive integer greater than one;
   (b) sensing the response of subsurface formations to the emitted cycles of impulses at a seismic detector;
   (c) correlating the sensed response of the subsurface formations with a cycle of the Galois sequence to form at least three cycles of a correlation product, the first and last cycles containing end effects due to the finite time duration of the coded sequence of impulses;
   (d) discarding the first and last cycles of the correlation product containing the end effects; and
   (e) forming a record of the result of said steps of correlating and discarding.

2. The method of claim 1, wherein said step of forming a record comprises the step of:
   recording the result of said steps of correlating and discarding.

3. The method of claim 2, wherein said step of forming a record comprises the step of:
   plotting the result of said steps of correlating and discarding.

4. The method of claim 1, wherein said step of forming a record comprises the step of:
   plotting the result of said steps of correlating and discarding.

5. The method of claim 1, wherein said step of sensing comprises the step of:
   sensing the response of subsurface formations to the emitted cycles of impulses at plural seismic detectors.

6. The method of claim 1, wherein said step of sensing comprises the step of:
   sensing the response of subsurface formations to the emitted cycles of impulses at plural seismic detectors along a seismic line of profile.

7. The method of claim 1, wherein said step of sensing comprises the step of:
   sensing the response of subsurface formations to the emitted cycles of impulses at plural seismic detectors in a three-dimensional survey array.

8. The method of claim 1, wherein said step of sensing comprises the step of:
   sensing the response of subsurface formations to the emitted cycles of impulses at plural seismic detectors in a vertical seismic profiling array.

9. The method of claim 1, wherein said step of activating comprises the step of:
   activating plural seismic sources to emit impulses of at least three cycles of finite time duration and of a Galois sequence of order N, N being a positive integer greater than one.

10. The method of claim 1, wherein said step of activating comprises the step of:
    activating plural seismic sources to simultaneously emit impulses of at least three cycles of finite time duration and of a Galois sequence of order N, N being a positive integer greater than one.

11. The method of claim 1, wherein:
    (a) said step of activating comprises the step of activating plural seismic sources at different time subintervals in a composite time interval to each emit impulses of at least three cycles of finite time duration and of a Galois sequence of order N, N being a positive integer greater than one; and
    (b) said step of sensing comprises the step of sensing the response of subsurface formation to the emitted impulses in the composite time interval at the plural seismic detectors.

12. The method of claim 11, wherein:
    said step of correlating comprises the step of correlating the sensed response of each of the plural seismic detectors with one of the cycles of Galois sequences in the composite time interval.

13. The method of claim 12, wherein:
    said step of forming comprises the step of forming a separate record of said step of correlating the sensed response of each of the plural seismic detectors.

14. The method of claim 11, wherein:
    said step of activating comprises the step of activating plural seismic sources at non-overlapping time subintervals in a composite time interval to each emit impulses of at least three cycles of finite time duration and of a Galois sequence of order N, N being a positive integer greater than one.

15. The method of claim 1, wherein the Galois sequence is of the order four or higher.

16. The method of claim 1, wherein the Galois sequence is of the order eleven or less.

17. A method of seismic exploration with a coded sequence of impulses of finite time duration for correlation with a deconvolution operator to form a reflection wavelet which avoids end effects resulting from correlation, comprising the steps of:
    (a) activating a seismic source to emit impulses of a cycle of finite time duration and of a Galois sequence of order N, N being a positive integer greater than one;
    (b) sensing the response of subsurface formations to the emitted cycle of impulses at a seismic detector;

(c) correlating the sensed response of the subsurface formations with a cycle of the Galois sequence to form at least three cycles of a correlation product, the first and last cycles containing end effects due to the finite time duration of the coded sequence of impulses;

(d) discarding the first and last cycles of the correlation product containing the end effect; and (e) forming a record of the result of said steps of correlating and discarding.

18. The method of claim 17, wherein said step of forming a record comprises the step of:
recording the result of said step of correlating and discarding.

19. The method of claim 18, wherein said step of forming a record comprises the step of:
plotting the result of said steps of correlating and discarding.

20. The method of claim 17, wherein said step of forming a record comprises the step of:
plotting the result of said steps of correlating and discarding.

21. The method of claim 17, wherein said step of sensing comprises the step of:
sensing the response of subsurface formations to the emitted cycle of impulses at plural seismic detectors.

22. The method of claim 17, wherein said step of sensing comprises the step of:
sensing the response of subsurface formations to the emitted cycle of impulses at plural seismic detectors along a seismic line of profile.

23. The method of claim 17, wherein said step of sensing comprises the step of:
sensing the response of subsurface formations to the emitted cycle of impulses at plural seismic detectors in a three-dimensional survey array.

24. The method of claim 17, wherein said step of sensing comprises the step of:
sensing the response of subsurface formations to the emitted cycle of impulses at plural seismic detectors in a vertical seismic profiling array.

25. The method of claim 17, wherein said step of activating comprises the step of:
activating plural seismic sources to emit impulses of one cycle of finite time duration and of a Galois sequence of order N,N being a positive integer greater than one.

26. The method of claim 17, wherein said step of activating comprises the step of:
activating plural seismic sources to simultaneously emit impulses of one cycle of finite time duration and of a Galois sequence of order N,N being a positive integer greater than one.

27. The method of claim 17, wherein:
(a) said step of activating comprises the step of activating plural seismic sources at different time subintervals in a composite time interval to each emit impulses or one cycle of finite time duration and of a Galois sequence of order N,N being a positive integer greater than one; and
(b) said step of sensing comprises the step of sensing the response of subsurface formation to the emitted impulses in the composite time interval at the plural seismic detectors.

28. The method of claim 27, wherein:
said step of correlating comprises the step of correlating the sensed response of each of the plural seismic detectors with at least three cycles of Galois sequences in the composite time interval.

29. The method of claim 28, wherein:
said step of forming comprises the step of forming a separate record of said step of correlating the sensed response of each of the plural seismic detectors.

30. The method of claim 27, wherein:
said step of activating comprises the step of activating plural seismic sources at non-overlapping time subintervals in a composite time interval to each emit impulses of one cycle of finite time duration and of a Galois sequence of order N,N being a positive integer greater than one.

31. The method of claim 17, wherein the Galois sequence is of the order four or higher.

32. The method of claim 17, wherein the Galois sequence is of the order eleven or less.

* * * * *